United States Patent [19]

Gorgati

[11] 4,420,524

[45] * Dec. 13, 1983

[54] BITUMEN, ATACTIC POLYPROPYLENE AND PROPYLENE/ETHYLENE COPOLYMER COMPOSITIONS AND WATER-PROOFING MEMBRANES USING THE SAME

[75] Inventor: Romolo Gorgati, Bologna, Italy

[73] Assignee: Owens-Corning Fiberglas Corporation, Toledo, Ohio

[ * ] Notice: The portion of the term of this patent subsequent to Jan. 11, 2000 has been disclaimed.

[21] Appl. No.: 426,295

[22] Filed: Sep. 29, 1982

Related U.S. Application Data

[63] Continuation-in-part of Ser. No. 273,212, Jun. 12, 1981, Pat. No. 4,368,228, which is a continuation-in-part of Ser. No. 143,138, Apr. 23, 1980, abandoned.

[51] Int. Cl.$^3$ .............................................. B32B 5/12
[52] U.S. Cl. .................................... 428/110; 428/141; 428/247; 428/283; 428/284; 428/285; 428/291; 428/340; 428/402; 428/489; 428/913
[58] Field of Search ............... 428/141, 247, 283, 284, 428/285, 291, 340, 402, 489, 913, 110

[56] References Cited

U.S. PATENT DOCUMENTS

| | | | |
|---|---|---|---|
| 3,193,439 | 7/1965 | Price et al. | 428/489 |
| 3,336,179 | 8/1967 | Campbell et al. | 428/489 |
| 3,741,856 | 6/1973 | Hurst | 428/489 |
| 3,753,938 | 8/1973 | Edwardo | 428/489 |
| 3,917,895 | 11/1975 | Bosniack | 428/489 |
| 3,937,640 | 2/1976 | Tajima et al. | 428/489 |

FOREIGN PATENT DOCUMENTS

| | | |
|---|---|---|
| 69480 | 6/1974 | Luxembourg . |
| 197807 | 3/1975 | United Kingdom . |
| 1517595 | 7/1978 | United Kingdom . |

OTHER PUBLICATIONS

Preliminary Performance Criteria for Bituminous Membrane Roofing N.B.S Series 55 (1974).
*The Modified Bitumen One-Layers in Italy and Europe: Origins and Growth*, Romolo Gorgati.
Hendriks, N. A., "Non-Woven Fabrics in Roofing".

*Primary Examiner*—James J. Bell
*Attorney, Agent, or Firm*—Ronald C. Hudgens; Ted C. Gillespie; Paul J. Rose

[57] ABSTRACT

This invention relates to a novel bitumen mixture and a high performance prefabricated waterproofing membrane useful for roofing which is obtained by impregnating different layers of reinforcing material with the bitumen mixture. More particularly, the invention relates to a novel bitumen mixture and a waterproofing membrane comprising a series of reinforcing layers including a polyester mat, a mat of fiberglass and a fiberglass net. Each reinforcing layer is impregnated with bitumen mixed with a thermoplastic polymer wherein the polymer is selected from the group consisting of an amorphous copolymer of ethylene/propylene, atactic polypropylene, polyisobutylene and styrene-butadiene-styrene block copolymer. The mixture has a ring and ball softening point of at least 105° C. and preferably about 155° C.

10 Claims, No Drawings

BITUMEN, ATACTIC POLYPROPYLENE AND PROPYLENE/ETHYLENE COPOLYMER COMPOSITIONS AND WATER-PROOFING MEMBRANES USING THE SAME

BACKGROUND OF THE INVENTION

This application is a continuation-in-part of application Ser. No. 273,212 filed June 12, 1981 now U.S. Pat. No. 4,368,228 which is a continuation-in-part of application Ser. No. 143,138 filed Apr. 23, 1980, now abandoned.

This invention relates to a novel bitumen mixture and a high performance prefabricated waterproofing membrane useful for roofing which is obtained by impregnating different layers of reinforcing material with the bitumen mixture. More particularly, the invention relates to a novel bitumen mixture and a waterproofing membrane comprising a series of reinforcing layers including a polyester mat, a mat of fiberglass and a fiberglass net. Each reinforcing layer is impregnated with bitumen mixed with a thermoplastic polymer wherein the polymer is selected from the group consisting of an amorphous copolymer of ethylene/propylene, atactic polypropylene, polyisobutylene and styrene-butadiene-styrene block copolymer. The mixture has a minimum ring and ball softening point of about 105° C. and preferably 155° C. Preferably the bitumen contains amorphous ethylene/propylene copolymer, a mixture of atactic polypropylene polymer and ethylene propylene copolymer containing mineral oil and isotactic polypropylene.

For almost a century bituminous roofing membranes have been used in the United States to protect buildings, their contents and the occupants from the weather. The most common type of bituminous roofing membranes consist of two to five layers of felt or fabric which during application to the roof are made to adhere together with bituminous material, such as tar, pitch or asphalt. The fabrics or felts may contain organic material, asbestos or glass. In general, these types of roofing membrane have been the source of problems for manufacturers of the membrane, roof designers, appliers and users. The incidence of failures in flat roof waterproofing membranes has increased in the order of 30 percent in that time period. The problems have been attributed in part to poor design, inadequate materials and improper workmanship, but many believe that the problem is more fundamental.

Conventional roofing membranes were originally developed in order to cover concrete and wood roofs which formed a relatively stable rigid base for the roofing membrane. Today roofs are being made of more flexible lightweight material and are often formed from prefabricated sheets or panels many of which have highly efficient thermal insulation. These changes in the thermal properties of the building materials have completely altered the temperature environment of the roofing membrane. This thermal change coupled with resulting movement in the joints of the roof and the insulation, places substantial local stress on conventional roofing membranes which were originally designed with relatively low tensile strength and elasticity.

An additional problem associated with traditional roofing material is that it requires about 12 lbs/m$^2$ of bitumen or other petroleum based products. Due to the high cost of petroleum and the efforts to conserve petroleum, it is also desirable to decrease the amount of petroleum based products used in roofing membranes.

Some attempts by others in the roofing field to produce an improved roofing material are described in U.S. Pat. Nos. 3,741,856; 3,753,938 and 3,937,640. U.S. Pat. No. 3,741,856 to Hurst issued Jan. 26, 1973, describes a bitumen waterproofing sheet which has a polyethylene support layer and a pressure sensitive adhesive backing. The Montague patent, U.S. Pat. No. 3,753,938, issued Aug. 21, 1973, describes a special roofing material which contains a mixture of bitumen, a synthetic elastomeric material which is predominantly chlorosulphonated polyethylene and fibrous material such as filaments of fiberglass or other synthetic bituminous roofing membrane comprising a base sheet of a synthetic polymer and one or more layers of bitumen. In addition, another roofing membrane has been developed in Europe in an attempt to meet the new requirements of modern roof construction and is the subject of patents in Luxembourg (No. 69480), France (No. 7505703) and Italy (No. 20554A/75). (See also Impermeabilizzazione Delle Construzioni, Romolo Gorgati, 1974 pp. 63–64.) The prefabricated roofing membrane developed in Europe contains a polyester mat and a fiberglass mat both impregnated with polymer modified bitumen. Although this roofing material has performed satisfactorily in some applications, it does not have the necessary tensile strength, dimensional stability, resistance to puncture, oxidation and aging needed for demanding modern roofing applications.

It is the object of this invention to provide a novel bitumen mixture and a novel waterproofing membrane using that bitumen mixture which has superior mechanical and physical-chemical characteristics which meet the preliminary performance criteria for bituminous membrane roofing published by the United States Department of Commerce/National Bureau of Standards and to achieve these superior characteristics without substantially increasing the total weight, cost of the roofing membrane or the amount of petroleum based product used.

SUMMARY OF THE INVENTION

It has now been discovered that a novel modified bitumen mixture for use in preparing waterproofing membranes comprises bitumen mixed with a thermoplastic polymer selected from the group consisting of an amorphous copolymer of ethylene/polypropylene, atactic polypropylene, polyisobutylene and styrene-butadiene-styrene block copolymer, the mixture having a ring and ball softening point of at least 105° C. and preferably about 155° C. The bitumen polymer mixture can be further modified by the addition of another polymeric material, selected from the group consisting of isotactic polypropylene, powdered rubber, a mixture of atactic polypropylene polymer and ethylene propylene copolymer and a mixture of atactic polypropylene polymer and ethylene propylene copolymer containing mineral oil.

It has also been discovered that a superior prefabricated waterproofing membrane may be prepared using the modified bitumen mixture according to the invention. This invention comprises reinforcing layers including a fiberglass mat, a polyester mat and a fiberglass net, each mat and net impregnated with the novel bitumen mixture as set forth above.

The improved waterproofing membrane is formed by the conventional method which is employed in Europe to manufacture European type roofing membranes. The polymeric materials are melted and stirred in a heated autoclave and the bitumen is added and blended for about 1-2 hours. In a second agitated autoclave additional bitumen and fillers are mixed for about 5-10 minutes at about 100°-150° C. At the end of the mixing period the two mixtures are combined and homogenized to form the bitumen polymer mixture. The reinforcing layers are impregnated with the bitumen polymer mixture by passing the reinforcing layers through the bitumen polymer mixture, at about 175° C., whereby the reinforcing layers and the bitumen polymer mixture adhere and interact with each other to form a single waterproofing membrane with superior mechanical and physical-chemical characteristics over known waterproofing membranes. The reinforcing layers are preferably positioned together at a point above the median point of the membrane close to the upper surface of the membrane in order that the bulk of the bitumen polymer mixture in the membrane which acts as the adhesive for the membrane is below the reinforcing layers and is thereby shielded from the sun's ultraviolet rays. The bitumen polymer layer under the reinforcing layers is at least 1.5-2.5 mm thick. The preferred order of the reinforcing layers within the membrane is to have the fiberglass mat closest to the surface, the fiberglass net in the center and the polyester mat beneath it.

The polyester mat, the inner most reinforcing layer weighs from about 50-250 g/m$^2$ and (1) distributes internal tensions in the membrane and (2) improves the impact resistance of the membrane. Moreover, the polyester mat permits the membrane to remain impermeable to water even if the outer fiberglass mat and fiberglass net are ruptured by an external force. In some cases the polyester mat may also contain a polyester net or scrim which is integrally bonded to the polyester mat. The fiberglass mat weighs about 50-125 g/m$^2$ and, as the top reinforcing layer, provides thermal stability to the membrane both during manufacture and in application. It also serves to screen the membrane from ultraviolet rays and minimizes tearing due to the foot traffic associated with installation and maintenance.

The middle fiberglass net weighs about 60-100 g/m$^2$ and adds additional stability to the waterproofing membrane without significantly increasing the thickness or weight of the membrane. The additional stability provided by the fiberglass net is needed in order to minimize movement in the membrane due to thermal changes. The open weave of the net is from about 1 mm to 5 mm, and preferably about 3 mm, which allows the bitumen polymer mixture to flow through the net and provide good contact between the polyester mat below and the fiberglass mat above. The addition of the fiberglass net which has definite structure and rigidity as compared to the fiberglass mat improves tensile strength, but does not decrease the elongation at the break of the resulting membrane. Rather surprisingly, the presence of the fiberglass net tends to increase the elongation at break of the membrane. Bayex GF5710, available from Bayex, Inc., Tonawanda, N.Y., can be used for this purpose.

In an alternate embodiment, the fiberglass net is bonded to the polyester mat. The resulting fiberglass net/polyester mat bonded layer and a fiberglass mat are then passed through the bitumen polymer mixture to form the waterproofing layer as described above. The polyester mat and fiberglass net can be bonded together by any appropriate method for example, using polyvinyl chloride adhesives such as polyvinyl chloride latex or plastisol. The polyester mat may also contain a polyester net or scrim which is integrally bonded to the polyester mat. Bamiliex XP428 (product of Bayex, Inc.) can be used.

Bamilex 435 (product of Bayex Inc.) is an example of a bonded fiberglass net/polyester mat which can be used. In Bamilex XP435 a fiberglass net and a polyester mat containing a polyester net are bonded together using a polyvinyl chloride adhesive.

In another embodiment, the fiberglass net is made with fiberglass fibers containing about 20-25% polyvinyl chloride threads and the glass net is heat fused directly to the polyester mat at a temperature of about 100° C. to form a single fiberglass net/polyester mat layer. The polyvinyl chloride threads melt and serve to bond the layers together. The resulting single layer is thinner than the combined thickness of the unbonded polyester mat and fiberglass net. The single fiberglass net/polyester mat layer is then used as described above with the fiberglass mat to form the waterproofing membrane.

Regardless of how the reinforcing layers are prepared, the resulting waterproofing membrane is about 4 mm thick. However, since the bonded fiberglass net/polyester mat is thinner than when each layer is combined separately, the resulting waterproofing membrane can contain more of the bitumen mixture below the reinforcing layers and still be about 4 mm thick. In addition the use of bonded reinforcing layers rather than individual separate layers allows for faster manufacturing speeds since the bonding step helps to eliminate the formation of air bubbles between the layers during impregnation with bitumen.

Bitumen as used in making the novel waterproofing membrane is a solid or viscous semisolid mixture of hydrocarbons which is obtained from petroleum by distillation of the lighter hydrocarbons at atmospheric pressure. The ring and ball softening point of the bitumen can vary, but the most common range is between 30° C. and 110° C. The ring and ball softening test is a standard test described in *Impermeabilizzazione Delle Costruzione*, Romolo Gorgati, 1974, pp. 13-14. The ring and ball softening point of bitumen is the temperature at which a standard steel ball placed on a standard ring filled with bitumen penetrates into the bitumen. It is also known as asphalt and may also be obtained from the acid sludge produced by treating the heavy distillates of asphalt based petroleum with concentrated sulfuric acid.

In order to improve the elasticity, flexibility, homogeniety, cold cohesion and aging of the resulting waterproofing membrane, the bitumen is modified by mixing with a thermoplastic polymer such that the bitumen polymer mixture has a ring and ball softening point of at least 105° C., and preferably about 155° C.

Examples of suitable polymers for modifying bitumen are amorphous ethylene/propylene copolymers, atactic polypropylene, polyisobutylene and styrene-butadiene-styrene block copolymer. Preferably, amorphous ethylene/propylene block copolymer is used because of its high resistance to oxidation and its elasticity. Ethylene/propylene copolymer is usually, but not necessarily, a by-product of the production of polypropylene. The preferred copolymer has a viscosity of about 0.3-25 million CPS (centipoise) at about 180° C. and contains from 0-40% ethylene, preferably 20-30%, and may contain some atactic and isotactic polypropylene. Prior to this invention, amorphous ethylene/propylene copolymer had been considered to be of no industrial value because of the high viscosity and resulting fusion problems. This invention takes these previously undesirable properties and utilizes them to prepare a bitumen mixture and a waterproofing membrane with superior mechanical and physical characteristics.

In the preferred embodiment, additional modifiers selected from the group consisting of atactic polypropylene, powdered rubber, isotactic polypropylene, a mixture of atactic polypropylene polymer and ethylene propylene copolymer and a mixture of atactic polypropylene polymer and ethylene propylene copolymer containing mineral oil are added to the bitumen polymer mixture to further improve its characteristics. The mixture of atactic polypropylene polymer and ethylene polypropylene copolymer containing mineral oil, a byproduct of the process for separating atactic and isotactic polypropylene, is the preferred additional modifier and is often used in the bitumen in combination with isotactic polypropylene. The mineral oil in the preferred modifier can be, for example, paraffin or one of its homologs. Powdered rubber which can also be used as an additional modifier in this invention is obtained from natural or synthetic rubber, or a mixture thereof, and has a particle size of about 20–50 microns. Atactic polypropylene, another modifier, is obtained as a byproduct of the process for producing isotactic polypropylene.

The preferred bitumen polymer mixture may also contain a plasticizer, for example, a paraffin lubricating oil having an Engler viscosity lower than 10 at 50° C. If the mixture of atactic polypropylene polymer and ethylene copolymer containing mineral oil is used, the plasticizer is not needed.

The preferred bitumen mixture also contains fillers to decrease oxidation and slow the aging of the waterproofing membrane. Suitable fillers have a particle size of about 10 to 75 microns, and may include, for example, spent lime (calcium hydroxide oxide), talc (magnesium silicate $Mg_3Si_4O_{10}(OH_2)$), ground sand, ground slate, ground cement, diatomaceous earth, clay and titanium dioxide. Preferably, the filler is any inert absorbant material such as spent lime.

The novel bitumen mixture used to impregnate the reinforcement layers, and thereby to form the waterproofing membrane, contains about 50–70% bitumen, about 10–50% polymer and about 0–20% fillers. The preferred bitumen mixture contains about 67% bitumen, about 24% polymers, and about 9% fillers and additives.

The composition of the bitumen mixture can be adjusted in order to adapt to local climate conditions. In colder climates, for example, the bitumen mixture preferably contains about 65% bitumen, about 28% polymer and about 7% other fillers and additives. In warmer climates the mixture preferably contains, for example, about 62% bitumen, about 22% polymer and about 16% other additives.

The waterproofing membrane which results from the impregnation of a fiberglass mat, a fiberglass net and a polyester mat with the bitumen polymer mixture is about 4–7 mm thick, preferably 4–5 mm, and weighs about 4.3–5.4 Kg/m². In embodiments containing the bonded fiberglass net/polyester mat, the thickness and weight of the finished product are normally about the same.

The surface of the resulting waterproofing membrane is dusted lightly with talc or some other suitable material to prevent sticking, covered with a protective film such as polyethylene and rolled up and packaged in rolls about 100–110 cm high and 7–10 meters long. The waterproofing membranes are placed loose on the roof surface or are fused in place on the roof using a gas burner or similar equipment. In applying the membrane to the surface, the membranes are overlapped at the edges and fused to insure complete waterproofing.

In general, the unaged waterproofing membrane of about 4 mm thickness has superior physical-mechanical characteristics as listed in Table I and can be expected to give at least 20 years of service under normal conditions.

TABLE I

| Physical Mechanical Properties of an unaged 4 mm waterproofing membrane | |
|---|---|
| Property | Value |
| Creep due to heat (DIN 53.123/18190) (AIB 4687.02) | 120° C. |
| Low temperature flexibility (AIB 4224) | −10° C. |
| Permeability to water under pressure (DIN 16935) | none (131' column of water) |
| Vapor permeation Index (23° C.) | 11.2934 g/m²/24 hrs) (24 hrs) 10.2714 g/m²/24 hrs) (72 hrs) Permeance = 0.0246 meters perms |
| Solubility in water (25° C.) | 0.019 mg/cm² |
| Tensile Strength (ASTM 2523) | 200 lbs/in |
| Elasticity modulus | 0.13 |
| Coefficient of thermal expansion (30°–0° F.) | $20 \times 10^{-6}$ |
| Longitudinal elongation at break* 0° F. (ASTM 2523) | 3% |
| Transversal Elongation at break 0° F. (ASTM 2523) | 3% |

*Percent elongation at break is equivalent to the percent strain.

The waterproofing membrane also has high impact strength when tested according to ASTM D-2643 6.7. At 3.9° C. no damage to the membrane was observed and at −13° C. only a slight crack at the point of impact was observed when the sample was bent. Visible cracking occurred at the point of impact when a standard weight was dropped from a height of seven feet.

DETAILED DISCUSSION OF THE INVENTION

This invention will be more fully understood through the following examples which are used only for illustration and are not meant to limit this invention in any way.

EXAMPLE 1

A waterproofing membrane was prepared by impregnating three reinforcing layers, that is a fiberglass mat which weighed 70 g/m², a fiberglass net which weighed 80 g/m², and polyester mat which weighed 150 g/m² with a bitumen polymer mixture which contained 66.7 bitumen, 12.7% ethylene/propylene copolymer, 9.5% atactic polypropylene, 2.4% isotactic polypropylene and 8.7% fillers (spent lime and talc). In order to prepare the bitumen polymer mixture, 800 kg of copolymer of ethylene/propylene, 600 kg atactic polypropylene and 150 kg isotactic polypropylene were melted in an agitated autoclave at 190° C. allowing a minimum time for the operation. 2100 kg of bitumen were added keeping the blend at 150° C. for one and one-half hours. The temperature should not be allowed to exceed 195° C. In another stirred autoclave, 2100 kg bitumen, 150 kg talc and 400 kg spent lime were mixed for 10 minutes at 150° C. At the end of the operation, the second blend was homogenized with the first blend at about 175° C. for 6 hours. At this point, the bitumen polymer mixture had acquired the characteristics of an entirely new substance having a ring and ball softening point of 150° C. and good flexibility down to −8° C.

The reinforcing layers were passed through the bitumen polymer mixture and allowed to adhere together to form the waterproofing membrane which had a total weight of 4.4 Kg/m$^2$, a thickness of 4 mm. The bitumen polymer layer under the reinforcing layer was 1.5 mm thick.

The superior physical properties of the waterproofing membrane described in Example 1 were tested according to *Recommended Practice for Testing Load-Strain Properties of Roof Membranes*, ASTM-D-2523-70, Part 11, ASTM Annual Book of Standards, 1973 which is incorporated herein by reference. Each test was performed six times, three times on transverse samples and three times on longitudinal samples. The results of those tests appear in Tables II and III, respectively.

TABLE II

TRANSVERSE SAMPLES

|  |  |  |  | Average Test Value |
|---|---|---|---|---|
| Average coefficient of expansion (73–30° F.) | — | — | $4 \times 10^{-6}$ | $4 \times 10^{-6}$ |
| Average coefficient of expansion (30–0° F.) | $20 \times 10^{-6}$ | $16 \times 10^{-6}$ | $6 \times 10^{-6}$ | $14 \times 10^{-6}$ |
| Tensile strength lbs/in (0° F.) | 290 | 224 | 246 | 253.3 |
| Percent elongation at break (0° F.) | 2.90 | 4.65 | 3.19 | 3.58 |
| Load Strain modulus × 10$^4$ lbs/in (0° F.) | 0.4995 | 0.2407 | 0.3850 | .3750 |
| Modulus of Elasticity (lbs/in) | — | — | — | 0.13 |

TABLE III

LONGITUDINAL SAMPLES

|  |  |  |  | Average Test Value |
|---|---|---|---|---|
| Average coefficient of expansion (73–30° F.) | $1 \times 10^{-6}$ | $3 \times 10^{-6}$ | $6 \times 10^{-6}$ | $3.3 \times 10^{-6}$ |
| Average coefficient of expansion (30–0° F.) | $24 \times 10^{-6}$ | $26 \times 10^{-6}$ | $26 \times 10^{-6}$ | $25.3 \times 10^{-6}$ |
| Tensile strength lbs/in (0° F.) | 210 | 238 | 232 | 226.6 |
| Percent elongation at break (0° F.) | 3.26 | 3.10 | 3.31 | 3.22 |
| Load Strain modulus × 10$^4$ lbs/in (0° F.) | 0.3217 | 0.3836 | 0.3502 | .3518 |
| Modulus of Elasticity (lbs/in) | — | — | — | 0.13 |

It can be seen from these test results that the novel waterproofing membrane as described in Example 1 has a superior thermal expansion coefficient and high elasticity. The average modulus of elasticity of the improved waterproofing membrane described in Example 1 is 0.13 in both the longitudinal and transverse directions of the membrane.

Comparisons have shown that the longitudinal modulus of elasticity for Example 1 is about 1.8 times higher than the average modulus of elasticity obtained for three leading roofing materials and about 2.7 times higher than the value for the least popular of the three materials and about 1.5 times higher than the leading material.

Comparisons have also shown that the transverse modulus of elasticity for the material described in Example 1 was about 2.2 times higher than the average value for the three leading materials; about 2.7 times higher than the value for the least popular materials and about 1.86 times higher than the leading material.

EXAMPLE 2

A waterproofing membrane was prepared by impregnating three reinforcing layers, that is a fiberglass mat which weighed 95 g/m$^2$, a fiberglass net which weighed 80 g/m$^2$, and polyester mat which weighed about 120 g/m$^2$ with a bitumen polymer mixture which contained 66.7% bitumen, 11.5% ethylene/propylene copolymer, 11.5% of a mixture of atactic polypropylene polymer and ethylene propylene copolymer containing mineral oil obtained from separating atactic and isotactic polypropylene, 1.5% isotactic polypropylene and 8.7% fillers (spent lime and talc). In order to prepare the bitumen polymer mixture, 725 kg of copolymer of ethylene/propylene, 725 kg atactic polypropylene and 95 kg isotactic polypropylene were melted in an agitated autoclave at 190° C. allowing a minimum time for the operation. 2100 kg of bitumen were added keeping the blend at 150° C. for one and one-half hours. The temperature should not be allowed to exceed 195° C. In another stirred autoclave, 2100 kg bitumen, 150 kg talc and 400 kg spent lime were mixed for 10 minutes at 150° C. At the end of the operation, the second blend was homogenized with the first blend at about 175° C. for 6 hours. At this point, the bitumen polymer mixture had acquired the characteristics of an entirely new substance having a ring and ball softening point of 155° C. and good flexibility down to −10° C.

The three reinforcing layers were passed through the bitumen polymer mixture and allowed to adhere together to form the waterproofing membrane which had a total weight of 4.4 Kg/m$^2$ and a thickness of 4 mm. The bitumen polymer layer under the reinforcing layer was 1.5 mm thick.

The superior physical properties of the waterproofing membrane described in Example 2 were tested as described for Example 1. Three samples were tested. The average of those three test results appear in Tables IV and V.

TABLE IV

TRANSVERSE SAMPLES

|  | Average Test Value |
|---|---|
| Average coefficient of expansion (73–30° F.) | $1.34 \times 10^{-6}$ |
| Average coefficient of expansion (30–0° F.) | $5.3 \times 10^{-6}$ |
| Tensile strength lbs/in (0° F.) | 244 |
| Percent elongation at break (0° F.) | 2.8 |
| Load Strain modulus | 0.879 |

TABLE IV-continued
TRANSVERSE SAMPLES

| | Average Test Value |
|---|---|
| × 10⁴ lbs/in (0° F.) Modulus of Elasticity (lbs/in) | 0.14 |

TABLE V
LONGITUDINAL SAMPLES

| | Average Test Value |
|---|---|
| Average coefficient of expansion (73–30° F.) | $1.48 \times 10^{-6}$ |
| Average coefficient of expansion (30–0° F.) | $3.0 \times 10^{-6}$ |
| Tensile strength lbs/in (0° F.) | 252.5 |
| Percent elongation at break (0° F.) | 2.8 |
| Load Strain modulus × 10⁴ lbs/in (0° F.) | 0.916 |
| Modulus of Elasticity (lbs/in) | 0.14 |

It can be seen from these test results that the novel waterproofing membrane as described in Example 2 has a lower and, therefore, superior thermal expansion coefficient as well as high elasticity. The average modulus of elasticity of the improved waterproofing membrane described in Example 2 is 0.14 in both the longitudinal and transverse directions of the membrane.

Comparisons have shown that the longitudinal modulus of elasticity for Example 2 is about 1.9 times higher than the average modulus of elasticity obtained for three leading roofing materials and about 2.7 times higher than the value for the least popular of the three materials and about 1.6 times higher than the leading material.

Comparisons have also shown that the transverse modulus of elasticity for the material described in Example 2 was about 2.4 times higher than the average value for the three leading materials; about 2.9 times higher than the value for the least popular materials and about 2.0 times higher than the leading material.

EXAMPLE 3

A waterproofing membrane was prepared as described in Example 2 except that a fiberglass net is made with fiberglass fibers containing about 25% polyvinyl chloride threads and which weighed 80 g/m² was fused at about 100° C. with a polyester mat which weighed about 50 g/m². The fused polyester mat/fiberglass net single layer and a fiberglass mat which weighed 95 g/m² were passed through the bitumen polymer mixture and allowed to adhere together to form a waterproofing membrane which has a total weight of about 4.3 kg/m² and a thickness of about 4 mm.

In preliminary testing, the membrane was found to permit excellent tensile strength and percent elongation at break when proper impregnation was achieved, as shown below in Table VI.

TABLE VI

| Longitudinal | | | | | | |
|---|---|---|---|---|---|---|
| Tensile strength (lbs/in) 0° F. | 288 | 318 | 205 | 191* | — | 183* |
| Percent elongation at break | 3.5 | 3.9 | 2.3 | 2.2 | — | 1.9 |
| Transversal | | | | | | |
| Tensile strength (lbs/in) 0° F. | 171* | 225 | 177* | 172* | 165* | 226 |
| Percent elongation at break | 2.2 | 2.9 | 2.3 | 2.2 | 2.1 | 3.0 |

*samples not adequately impregnated

As will be seen from Table VI, the material must be properly impregnated with the mixture to achieve homogeneity and optimum properties on a consistent basis.

EXAMPLE 4

A waterproofing membrane was prepared as described in Example 2 except that Bamilex 435 was used. Bamilex 435 contains a fiberglass scrim (net) weighing about 70 g/m² bonded, using a polyvinyl chloride adhesive, to a polyester mat which weigh about 110 g/m². The polyester mat in Bamilex 435 also contained a polyester scrim. The bonded fiberglass net/polyester mat which weighed 200 g/m² and the fiberglass mat which weighed 95 g/m² were passed through the bitumen polymer mixture and allowed to adhere together to form a waterproofing membrane which had a total weight of about 4.3 kg/m² and a thickness of about 4 mm.

In testing, the membrane was found to have excellent tensile strength and percent elongation at break, as shown below in Table VII.

TABLE VII

| Longitudinal | | | |
|---|---|---|---|
| Tensile Strength (lbs/in) 0° F. | 277 | 265 | 290 |
| Percent elongation at break | 4.1 | 3.6 | 3.9 |
| Transversal | | | |
| Tensile strength (lbs/in) 0° F. | 271 | 250 | 251 |
| Percent elongation at break | 3.1 | 3.5 | 3.3 |

EXAMPLE 5

A conventional waterproofing membrane was prepared by impregnating a fiberglass mat which weighed 50 g/m² and a polyester mat which weighed 150 g/m² with a bitumen mixture which contained 65.0% bitumen, 23.5% atactic polypropylene, 2.5% isotactic polypropylene and 9.0% fillers (talc and spent lime).

The bitumen mixture was prepared as in Example 1 and the reinforcing layers were passed through the bitumen mixture to form the conventional waterproofing membrane. The tensile strength and the percent strain at 0° F. of this membrane were measured by the same procedure used in Example 1.

The sample had a longitudinal tensile strength of 132 lbs/in and a percent strain of 3. The transverse tensile strength was 94 lbs/in and the transverse percent strain was 2%. It should be noted that not only are the tensile strengths and percent strain values for Examples 1, 2, 3 and 4 significantly better than those for Example 5, but there is greater consistency in the transverse and longitudinal values for Examples 1, 2, 3 and 4 than for Example 5. These results demonstrate that not only do the novel membranes described in Examples 1, 2, 3 and 4 give superior values over conventional membranes (Example 5), but those values are also more consistent throughout the membrane regardless of test direction.

I claim:

1. A prefabricated waterproofing membrane which comprises a series of superposed reinforcing layers including a fiberglass mat and a bonded fiberglass net/polyester mat, said layers being impregnated with bitumen mixed with at least one thermoplastic polymer selected from the group consisting of an amorphous copolymer of ethylene/propylene, atactic polypropylene, polyisobutylene and styrene-butadiene-styrene block copolymer, the bitumen polymer mixture having a ring and ball softening point of at least 105° C.

2. The waterproofing membrane as described in claim 1 wherein the bitumen polymer mixture is further modified by the addition of at least one polymeric material selected from the group consisting of isotactic polypropylene, a mixture of atactic polypropylene polymer and ethylene propylene copolymer and a mixture of atactic polypropylene polymer and ethylene propylene copolymer containing mineral oil.

3. The waterproofing membrane as described in claim 2 wherein the fiberglass mat weighs about 50–125 g/m$^2$, the polyester mat weighs about 50–250 g/m$^2$ and the fiberglass net weighs about 60–100 g/m$^2$.

4. The waterproofing membrane as described in claim 3 wherein the fiberglass mat is the closest to the surface.

5. The waterproofing membrane as described in claim 4 wherein the bitumen is mixed with an amorphous copolymer of ethylene propylene and the bitumen polymer mixture is modified with at least one of the materials selected from the group consisting of atactic polypropylene and isotactic polypropylene.

6. The waterproofing membrane as described in claim 4 wherein the bitumen is mixed with an amorphous copolymer of ethylene propylene and the bitumen polymer mixture is modified with a mixture of atactic polypropylene polymer and ethylene propylene copolymer containing mineral oil and isotactic polypropylene.

7. The waterproofing membrane as described in claim 1 wherein the bitumen polymer mixture has a ring and ball softening point of about 155° C.

8. The waterproofing membrane as described in claim 1 wherein the bitumen polymer mixture is further modified by the addition of powdered rubber.

9. The waterproofing membrane as described in claim 1 wherein the fiberglass mat weighs about 50–125 g/m$^2$, the polyester mat weighs about 50–125 g/m$^2$ and the fiberglass net weighs about 60–100 g/m$^2$.

10. A waterproofing membrane as described in claim 2, wherein the polyester mat contains a polyester net bonded to the polyester mat.

* * * * *